Sept. 23, 1969  I. S. FRYE  3,468,123
ADJUSTABLE SHACKLE
Filed Aug. 1, 1967

INVENTOR
IRVIN S. FRYE
BY Robillard and Beyrne
ATTORNEYS

_United States Patent Office_

3,468,123
Patented Sept. 23, 1969

3,468,123
ADJUSTABLE SHACKLE
Irvin S. Frye, Washington, D.C., assignor to Ocean Science & Engineering, Inc., Washington, D.C., a corporation of Delaware
Filed Aug. 1, 1967, Ser. No. 657,668
Int. Cl. F16g 13/06
U.S. Cl. 59—86                 9 Claims

ABSTRACT OF THE DISCLOSURE

First and second links, each having a pair of apertured ears extending angularly therefrom, first and second clamping bolts inserted through opposing ears of the respective links and through an opening in the members to be connected and at least one of the apertures of said ears being elongated in a direction normal to the plane of the member of which it is not engaged.

---

This invention relates generally to a connector for joining two members of different widths and more particularly to a connector for joining the members without the use of shims or other separate adjustment apparatus.

A principal objective of this invention is to provide a shackle for joining apertured members such as eye-bolts, plates, chains and the like having various thicknesses.

Another important objective of the invention is to provide a shackle apparatus which can positively connect unlike members in a quick and advantageous manner.

A still further objective of the invention is to provide a linkage arrangement which is readily adaptable to either fixedly secure two members together or to permit relative movement therebetween.

Another objective of the invention is to provide a shackle having a wide variety of uses the components thereof which can be manufactured from simple castings.

\A still further objective of the invention is to provide a shackle of a type which is quickly applied to the connecting members, is durable in use and which is economical in its manufacture.

Figure 1:
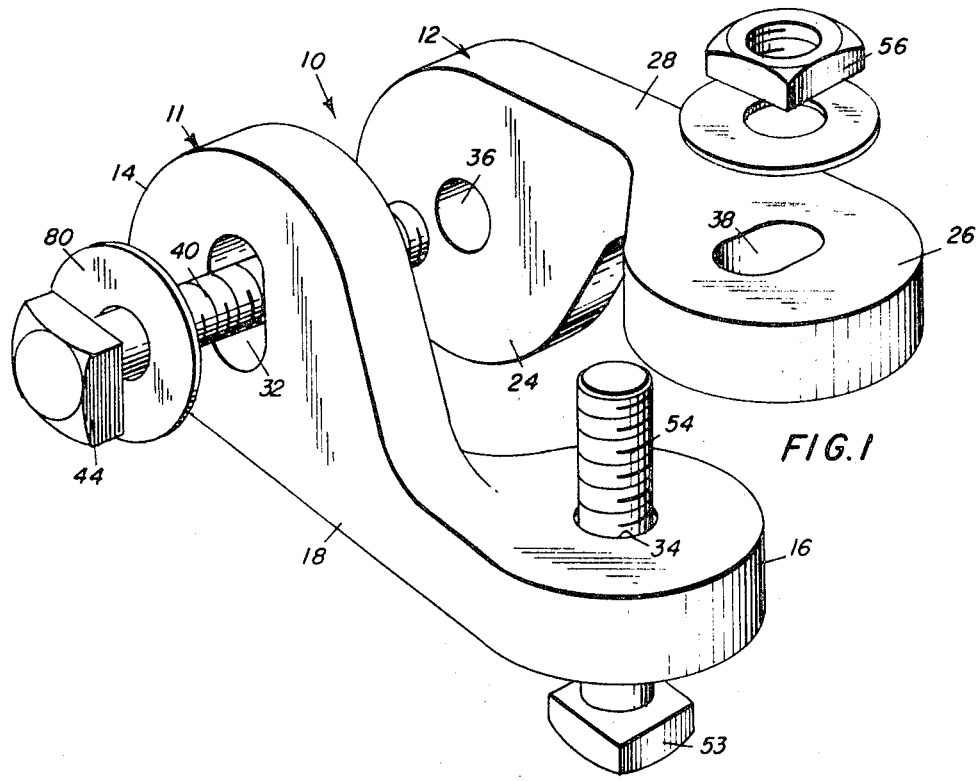
Figure 2:
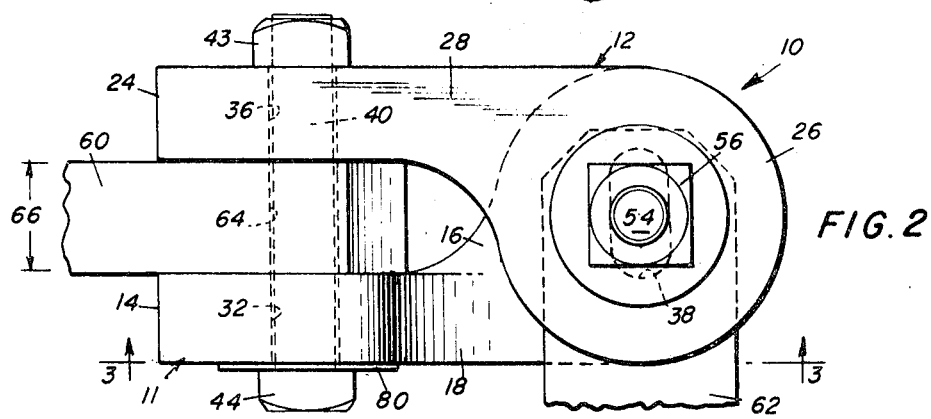
Figure 3:
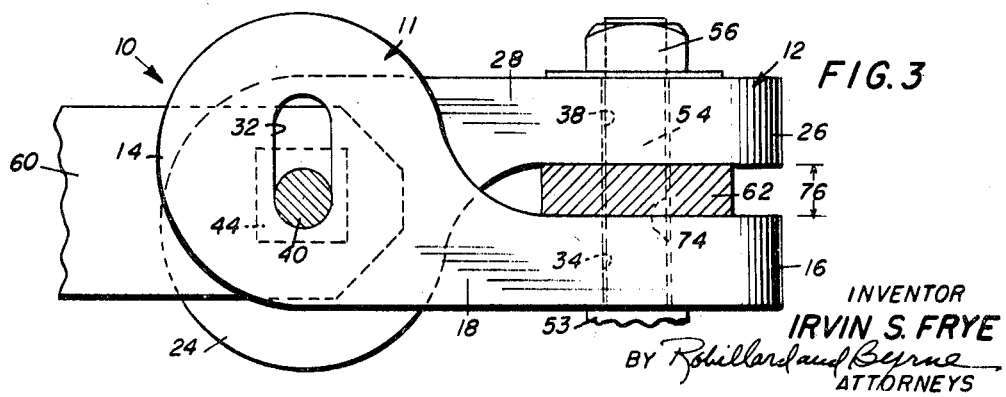

These and other objects of the invention will become more apparent to those skilled in the art by reference to the following detailed description when viewed in light of the accompanying drawings, wherein:

FIGURE 1 is an exploded perspective of the invention;
FIGURE 2 is an assembled plan view thereof; and
FIGURE 3 is an assembled side view.

Referring now to the drawings, wherein like elements indicate like parts, the numeral 10 indicates the connector of this invention. The connector includes a first link 11 and a second link 12. Extending outwardly from link 11 is a first ear 14 and, longitudinally displaced therefrom and extending normal to the plane of ear 14, is a second ear 16. The ears are spaced along an intermediate portion 18 of the link which may be of various lengths depending upon the environment of use of the connector.

The second ear 12 has a third ear 24 extending outwardly therefrom, a fourth ear 26 extending outwardly therefrom with the same angular offset as ear 16 is to ear 14 whereby when ears 14 and 24 are disposed parallel to one another ears 16 and 26 are also in parallel relationship with each other. The ears of link 12 are connected by an intermediate portion 28 which is of the same length as intermediate portion 18.

The ear 14 is apertured by a slotted groove 32 and the ear 16 is apertured by circular opening 34. The ear 24 of link 12 is normally placed in opposing relationship with ear 14 of link 10 and is apertured with a circular opening 36. The ear 26 is apertured by an elongated slot 38.

The linkage further includes bolt members 40 and 42. The bolt 40 is headed at 43 and is threaded at its other end at 44. A nut 46 threaded at 48 is adapted to meet with the threads 44. The bolt 42 is headed at 53, is threaded at 54 and is provided with a nut member 56 threaded along its interior surface 58 to receive the threads 54.

The numerals 60 and 62 represent first and second members which are to be connected by the links of this invention. Member 60 can be a member such as an eyelet having an opening 64 therethrough and having a thickness 66. The member 62 is provided with an opening 74 therethrough and has a thickness 76.

In assembly, member 60 is placed between ears 14 and 24 and bolt member 40 is inserted through openings 32, 64 and 36. The nut member 46 is threaded onto its mating threads 44. A washer 80 is used to provide a more complete bearing surface for the bolt heads. A locking washer may be used under the nuts if desired. The member 62 is then placed between ears 16 and 26 in a like manner the bolt 42 is inserted through the openings 34, 74 and 38 and the nut 56 is threaded thereon.

As seen in FIGURES 2 and 3, the member 62 has a different width than member 60. However, since aperture 38 is slotted in the direction of the plane of ears 14 and 24, these ear members can move toward one another until the eye bolt 60 is grasped firmly therebetween. Likewise, the ears 16 and 26 have the same ability to grasp member 62 of a different thickness than member 60. The linkage assembly therefore can grasp members such as 60 and 62 having different thicknesses without the use of shims or other inconvenient adjusting mechanism. If it is desired to permit the plates, eyebolts or other such members as 60 and 62 to rotate with respect to the link and to the member to which it is connected, annular bearings can be disposed about the bolt between the ears and the members to be joined.

Linkages of strength are economically produced by utilizing the teachings of this invention. The linkages 11 and 12 can be made of a one-piece cast by methods known to the art and the bolt members 40 and 42 can be of standard make. It should also be understood that the connected members, although described as eyebolts 60 and 62, can be members of any shape and can take the form of plates, mooring eyes or other objects of the same or different thicknesses.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

What is claimed is:
1. A shackle for connecting first and second members comprising
   a first elongated link,
   a first ear extending outwardly from said link,
   a second ear extending outwardly from said link and longitudinally displaced from said first ear and angularly disposed with respect thereto,
   a second elongated link,
   a third ear extending outwardly from said second link,
   a fourth ear extending outwardly from said second link at the same longitudinal distance from the said third ear as said second ear is displaced from said first ear and at the same angular disposition with respect to said third ear as said second ear is to said first ear, and
   clamp means to draw said first ear toward said third ear for holding said first member when placed therebetween.

2. The shackle of claim 1 wherein second clamp means draws said second ear toward said fourth ear for holding said second member when placed therebetween.

3. The shackle of claim 2 wherein connector sections of said first and second members have first and second openings therethrough and said invention further comprises said first and third ears having apertures therethrough adapted for coaxial placement with said first opening.

4. The shackle of claim 3 wherein said second and fourth ears each have apertures therethrough adapted for coaxial placement with said second opening.

5. The shackle of claim 3 wherein said first clamp means comprises
an elongated member extending through said apertures of said first and third ears and said first opening,
a stop at one end of said elongated member and a lock member movable toward and away from said stop at the other end of said elongated member.

6. The shackle of claim 3 wherein said second clamps comprise a bolt means extending through said second and fourth ears and said second opening and a nut means threadably secured thereto.

7. The shackle of claim 5 wherein one of said apertures in one of said ears is elongated.

8. The shackle of claim 4 wherein the aperture of said first ear is elongated in a direction parallel to the plane of said second and fourth ears.

9. The shackle of claim 8 wherein the aperture of said fourth ear is elongated a direction normal to the direction of elongation of said aperture of said first ear.

References Cited
UNITED STATES PATENTS

| | | | |
|---|---|---|---|
| 541,997 | 7/1895 | Fravega | 64—2 |
| 2,362,383 | 11/1944 | Lendinara | 287—1 |
| 2,440,532 | 4/1948 | Anderson | 24—135 |
| 2,775,422 | 12/1956 | Von Herbulis | 248—63 |
| 2,849,777 | 9/1958 | Ridgers | 24—248 |
| 761,812 | 6/1904 | Austin | 59—85 |
| 986,938 | 3/1911 | Nixon | 59—85 |
| 3,237,396 | 3/1966 | Brugnola | 59—85 |

CHARLES W. LANHAM, Primary Examiner

G. P. CROSBY, Assistant Examiner

U.S. Cl. X.R.

59—93